United States Patent [19]

Hartman

[11] Patent Number: 5,031,178
[45] Date of Patent: Jul. 9, 1991

[54] APPARATUS AND METHOD FOR GROUND ISOLATED SYSTEM DIAGNOSTICS

[75] Inventor: John L. Hartman, Minneapolis, Minn.

[73] Assignee: American Standard Inc., New York, N.Y.

[21] Appl. No.: 256,786

[22] Filed: Oct. 12, 1988

[51] Int. Cl.[5] .................. G06F 11/32; G08B 5/22
[52] U.S. Cl. ..................... 371/29; 340/635
[58] Field of Search ............ 371/15.1, 16.1, 17, 371/18, 20.1, 20.4, 25.1, 26, 29.1, 16.5; 364/184, 221.7; 455/352, 602; 358/194.1; 340/635

[56] References Cited

U.S. PATENT DOCUMENTS

| | | | |
|---|---|---|---|
| 3,825,896 | 7/1974 | Obenhaus | 340/147 |
| 3,910,322 | 10/1975 | Hardesty, Jr. et al. | 364/200 |
| 4,045,777 | 8/1977 | Mierzwinsky et al. | 455/352 X |
| 4,178,504 | 12/1979 | Farmer | 455/602 X |
| 4,215,269 | 7/1980 | Kuhn | 455/612 |
| 4,225,918 | 9/1980 | Beadle et al. | 364/200 |
| 4,276,656 | 6/1981 | Petryk, Jr. | 455/608 |
| 4,282,604 | 8/1981 | Jefferson | 455/602 |
| 4,350,973 | 9/1982 | Petryk, Jr. | 340/347 |
| 4,516,221 | 5/1985 | Nakata et al. | 364/900 |
| 4,596,049 | 6/1986 | Rizzotti, III | 455/603 |
| 4,623,887 | 11/1986 | Welles, II | 358/194.1 X |
| 4,691,386 | 9/1987 | Eumurian et al. | 455/607 |
| 4,718,118 | 1/1988 | Viola | 455/613 |

FOREIGN PATENT DOCUMENTS 242090 10/1987 European Pat. Off. ........ 340/870.29
223862 12/1984 Japan ..................... 371/29.1

OTHER PUBLICATIONS

Held, G., *Data Communications Testing and Troubleshooting*, Howard W. Sams & Co., 1988, pp. 96–118, 144–147.
Digilog 300 and 600 Protocol Analyzers, Advertisements, *Data Communications*, Dec. 1986, pp. 202, 203.
Murray, D. "Resourceful Debugger Sifts Through Faults in IEEE-802.3 Lans", *Electronic Design*, Jan. 24, 1985, pp. 173–180.
Rawson, E. "The Fibernet II Ethernet-Compatible Fiber-Optic Lan", *Journal of Lightwave Technology*, vol. LT-3, No. 3, Jun. 1985, pp. 496–501.

*Primary Examiner*—Stephen M. Baker
*Attorney, Agent, or Firm*—William J. Beres; William O'Driscoll; David L. Polsley

[57] ABSTRACT

In a microprocessor-operated system controller having a light source operated by the microprocessor for indicating the general operating status of the system controller, an apparatus and method for providing ground isolated system diagnostics of data transmitted from the system controller. The apparatus and method is comprised of means for superimposing a bit rate data transmission upon the light source when in a visual ON condition and a ground isolated optical receiver for receiving the superimposed bit rate data transmission, decoding and converting the data transmission to a corresponding electrical signal, and transmitting the bit rate data for interpretation in a monitor device such as a computer and printer.

4 Claims, 2 Drawing Sheets

APPARATUS AND METHOD FOR GROUND ISOLATED SYSTEM DIAGNOSTICS

TECHNICAL FIELD

This invention generally pertains to system diagnostics and specifically to a ground isolated system diagnostic apparatus and method for diagnosing a control system.

BACKGROUND ART

A typical microprocessor operated system control is responsive to a plurality of data inputs and provides at least one control output. For example, a typical system control for an air conditioning device such as a chiller or air handler would be responsive to such inputs as zone air temperature, supply air temperature, return air temperature, air velocity and so forth. In response to these inputs, the microprocessor of the system control will provide a control output to cause, for example, operation of the chiller or a change in air velocity supplied by the air handler. The microprocessor provides this control signal based upon instructions contained in a program or programs maintained in the controller and monitors the data input for compliance with the parameters called for in the program. In order to insure that the system controller is itself operating in conformity with the parameters set in the system control program, it is necessary to periodically monitor and diagnose the performance of the system controller.

Diagnostics of a system controller such as the foregoing typically is accomplished by providing subroutines in the main program of the system controller to provide data transmission through a data connector provided on the system controller. An interpreter or monitor device such as a computer or printer is connected to the data connector by a cable, and the data representing the current status of the system control is sent through cable to the monitor device. This method of transmitting the diagnostic data to the interpreting device requires the provision of a separate data output connector such as an industry standard RS-232, and in certain installations a controlling switch is also provided to permit an operator to activate the transmission of diagnostic data from the system controller. Furthermore, the cable connection to the data connector can alter the electrical characteristics of the system control circuitry, which may cause periodic or intermittent malfunctions to go undetected by the diagnostics device, or may even cause a malfunction false indication.

Alternatively, a monitor device may be attached by a permanent hard-wired connection to a system controller, permitting a diagnostic analysis of the system cpntroller data at any time. This method has the advantage of providing ongoing diagnostics of the system control and overcoming the object of providing a separate input output port or activation switch, as well as preventing alteration of the circuit characteristics of the system control. However, this method requires the use of a dedicated interpreting device, which is unnecessary and therefore unduly expensive in many applications, as it is often unnecessary to perform a diagnostic analysis of the system controller's performance barring an indication of improper operation. Therefore, the hard-wired connection is most suitable for application to installations having a relatively large number of system controllers and are therefore not as sensitive to the initial system cost and where ongoing monitoring of the system controller is desirable.

Since such system controllers are typically mass produced to meet requirements which vary widely from application to application, it is desirable to provide a means for diagnosing the operation of a system controller which is suitable for use in a broad range of applications. It is preferable to provide a system controller which is suitable for use in those systems which are cost. sensitive or do not require data interpretation and also for use in systems. Typically, an indicator is provided which permits a visual observation that the system controller is operating within the general limits specified by its program. The indicator is commonly a light source such as an LED (light emitting diode) having a specified pattern or cycle to indicate generally acceptable operation. For instance, the indicator may be a light source cyclically flashing one second ON and one second OFF, or two seconds ON and one second OFF, to indicate proper operation.

It is also possible include a read.out display and a controlling keypad or similar means of directing the diagnostics and data displayed to provide more specific information regarding the operation of the system controller. While this means provides an interface for a human operator at the site of the system controller, it involves unnecessary and undesirable additional expense and potential for unreliability due to the greatly increased number of components involved in the read.-out display and keypad. Furthermore, in order to achieve complete diagnostic analysis of the system controller operation, it is still frequently necessary to provide the data connector for connection with a separate monitor device to eliminate the possibility of faulty internal self-diagnosis by the system controller's microprocessor.

Therefore, it is an object of the present invention to provide a method of diagnosing the operation of a system controller which is both simple and reliable.

It is a further object of subject invention to provide a method of diagnosis the operation of a system controller as will be suitable for mass production.

It is still a further object of the present invention to provide such a method for diagnosing the operation of a system controller as will be conducive to implementation in a wide range of applications.

It is yet a still further object of the present invention to provide such an apparatus which is suitable for cost sensitive installations while providing complete data transmission capabilities.

It is another object of the present invention to provide an apparatus for diagnosing the operation of a system controller without affecting the characteristics of the electrical circuitry of the system controller.

These and other objects of the invention will be apparent from the attached drawings and the Description of the Preferred Embodiment that follows hereinbelow.

SUMMARY OF THE INVENTION

The subject invention is a method and apparatus for diagnosis the operation of a microprocessor-operated system controller, having a cyclical light source output providing a general visual indication of proper operation and a superimposed diagnostic data signal which is received by a ground isolated optical receiver and converted to an electrical data signal acceptable to a diagnostic interpreter device such as a computer or printer. The diagnostic data signal is superimposed as an ON- OFF signal at a suitable baud rate during the ON time of the visual indicator, referred to as the ON (visual) indication. The superimposed ON-OFF signal is received by the receiver and converted to data bits corresponding to the ON-OFF light source signal at the selected baud rate for transmission to the interpreting monitor device, wherein the operation of the system controller is diagnosed based on the received diagnostic data.

DESCRIPTION OF THE PREFERRED EMBODIMENT

Figure 1:
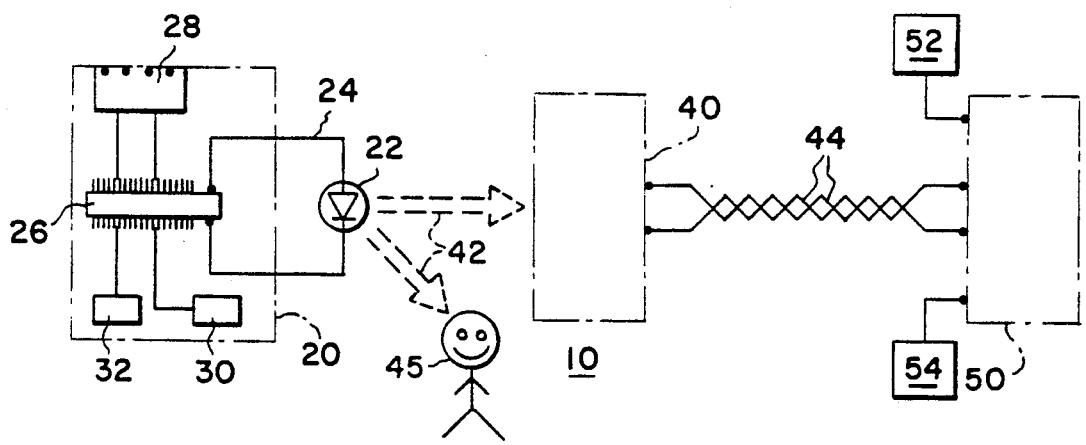
FIG. 1 is a block diagram showing generally the apparatus of the subject invention.

A diagnostic apparatus according to the subject invention generally denoted by reference numeral 10 is shown in FIG. 1 in block diagram form. The diagnostic apparatus 10 includes a microprocessor operated system controller 20 having a light source output 22 connected by leads 24 to a microprocessor 26. The leads 24 are representational, since additional circuitry would generally be required between the microprocessor 26 and the light source 22 to obtain the desired current and voltage supply for the light source 22.

The microprocessor 26 is connected through an input output interface 28 to such data input points and control output points as are desired. The data input points and control output points are not shown, as it is believed that those acquainted with the art are well versed in the appropriate connections and that a detailed understanding of such connections is not necessary or relevant to an understanding of the subject invention. The microprocessor 26 is also connected to a read only memory (ROM) 30 for containing a preprogrammed instruction set or main program for controlling the operation of the system controller 20, and to a random access memory (RAM) 32 acting as registers for processor storage by the microprocessor 26. The main program includes at least a subroutine for enabling the microprocessor 26 to encode machine readable information as a data transmission into the output of the light source 22.

A light emission receiver 40 receives light energy or emission from the light source 22 along the light path 42. Since the light emission from the LED 22 is not directed, the light path 42 will also be visible to an observer 45. Receiver 40 is connected by a connecting cable 44 to an interpreting or monitor device 50, which provides a means for comparing the electrical signal representing the data transmitted to the predetermined values. The interpreting or monitor device 50 may be a microcomputer, a cathode ray tube terminal, or a hard-copy printer. The appropriate monitor device 50 will depend upon the application of the system controller 20 and the type of information transmitted for diagnosis by the system controller. The primary function of the monitor device 50 is to convert the electrical signal representing the data transmission to a human readable output.

Typically, where the monitor device 50 is a microcomputer the monitor device 50 may also include a hard copy printer 52 to provide human readable printed, preservable records of the data, or a cathode ray tube display 54 to provide a human readable real-time display of the data. The monitor device 50 will preferably also include means such as a memory system for storing a desired, machine readable electrical signal sequence indicative of the desired operation of the system controller, a connection for receiving an electrical signal or data transmission, and a means such as a microprocessor 56 for comparing the actual electrical signal sequence or data received to the stored, desired electrical signal sequence or data. Such devices are believed to be well known and readily available.

Figure 2:
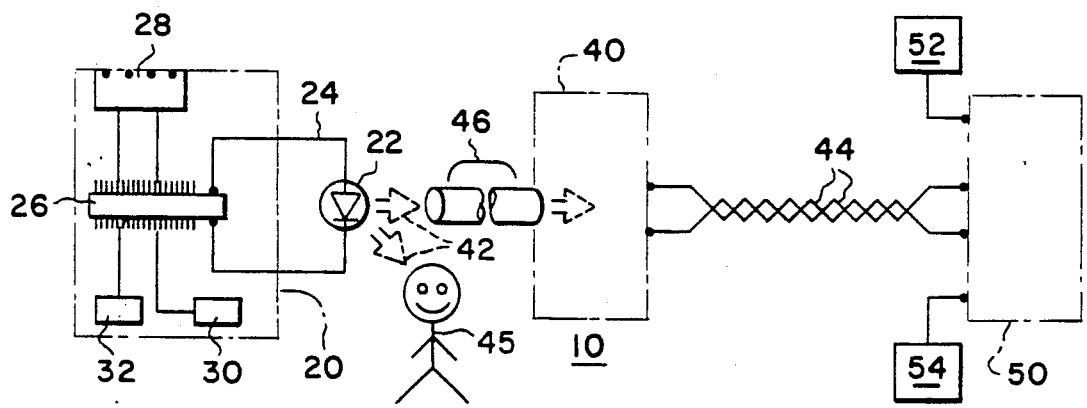
FIG. 2 is a schematic diagrammatic representation of an alternate embodiment of the apparatus of the subject invention.

FIG. 2 shows an alternative embodiment of the apparatus of the subject invention having an optical fiber or similar light wave carrier 46 acting as a portion of the light path 42. This alternative embodiment provides advantageous signal transmission characteristics while preserving the ground isolation of the preferred embodiment, but the fiber optic component does represent an additional expense which may not be desirable.

The system controller 20 as shown in FIGS. 1 and 2 is preferably operated by a single chip microprocessor 26 such as a Mitsubishi No. M50747, which in turn operates the light source 22 during normal operation in a pattern of one second ON followed by one second off. Preferably, the light source 22 is a light emitting diode (LED) and is therefore interchangeably denoted as the light source 22 or LED 22. The components of the system controller 20, including the LED 22, the microprocessor 26, the input/output interface 28, the ROM 30 and the RAM 32 are believed to be well known and readily available, and the configuration of the system controller will be readily apparent to those familiar with the art, although the precise components selected may vary. As is apparent in FIGS. 1 and 2, and generally known in the art, the LED 22 provides a visual indication of the general operating condition of the system controller 20 to an observer. Those skilled in the art will recognize that the observer will be able to receive this visual indication even in the absence of the receiver 40 and monitor 50 for receiving the specific data transmission via the LED 22.

Figure 3:
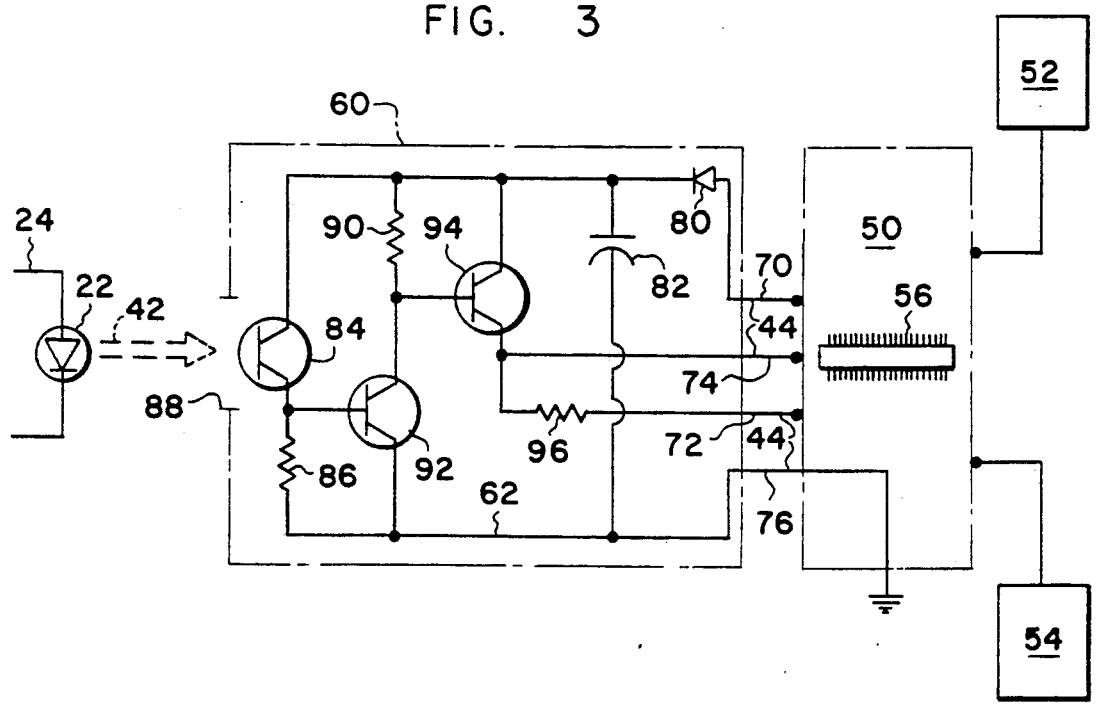
FIG. 3 is a schematic representation of the circuitry of the receiver of the subject invention.

Turning now to FIG. 3, a schematic circuit diagram of the apparatus of the subject invention is disclosed in more detail The receiver 40 includes a receiver housing 60 which is preferably an RS-232 hood. The receiver housing 60 contains a conversion circuit 62. The conversion circuit 62 is connected to and served by the connecting cable 44. Preferably, the connecting cable 44 is a standard RS-232 cable terminating at one end in the receiver housing 60 and at the other end in a standard RS-232 connecting hood for connection to the interpreting monitor device 50. Only four wires within the RS-232 cable are used. These wires are as follows: data terminal ready (DTR) 70, providing a normally positive voltage in the range of 6 to 12 volts, assigned to pinout number 20; transmit data (TXD) 72, providing a normally negative voltage in the range of 6 to 12 volts and assigned to pinout number 2; receive data (RXD) 74 assigned to pinout number 3; and a ground line (GND) 76. These pinout connections and the line assignments are in accordance with the generally accepted electrical engineering standards. This permits the use of any interpreting monitor device 50 which has suitable RS-232 connectors in accordance with the foregoing standards.

The DTR line 70, upon entering the receiver housing 60 immediately passes the voltage supply through a diode 80 and across a capacitor 82 to the GND line 76 so that the voltage supplied by the DTR line 70 is filtered. A phototransistor 84 and a resistor 86 are mounted in parallel with the capacitor 82. The phototransistor 84 is disposed within the receiver housing 60 adjacent an appropriate opening or aperture 88 whereby light may impinge upon the phototransistor 84. A second resistor 90 and a second transistor 92 are mounted in parallel with the capacitor 82 and the phototransistor 84 and resistor 86. The third or base leg of the second transistor 92 is connected between the phototransistor 84 and the first resistor 86. A third transistor 94 is also connected to the DTR line 70, having its base connection between the second resistor 90 and the second transistor 92 and its output connected to the RXD line 74. Finally, a third resistor 96 is disposed within the incoming TXD line 72, which is connected to the RXD line 74.

It should be noted that suitable components are readily available for the construction of such a circuit. For example, circuit could be constructed of the following components: the phototransistor 84, industry standard part number TIL414; the second transistor 92, industry standard part number 2N2222A; the third transistor 94, industry standard part number 2N2907A; the first resistor 86, 1M ohms., the second resistor 90, 47K ohms; the third resistor 96, 4.7K ohms; the diode, industry part number 1N914; the capacitor 82, 10 microfarads. It will be readily apparent to those skilled in the art that components having alternate values or characteristics could be suitably employed in the construction of an acceptable conversion circuit 62, and that the foregoing should not be taken as limiting but as exemplary only. In operation, the phototransistor 84 serves to pass only a leakage current level in the absence of light. The first resistor 86 and the second resistor 90 bypass any such leakage currents, preventing operation of the second transistor 92 and third transistor 94. As the third transistor is thus off in this condition, the output provided to the interpreting monitor device 50 is a negative voltage supplied by the TXD line 72.

When light is present, the phototransistor 84 conducts electricity from the positive voltage supplied by the DTR line 70, which in turn activates the second transistor 92 and the third transistor 94. The output from the third transistor 94 then overcomes the negative voltage supplied through the third resistor 96 of the TXD line 72 to provide a positive output electrical signal.

Therefore, when the phototransistor 84 is exposed to light transmitted by the LED 22, a positive output is provided on the capital RXD line 74, and when the LED 22 is not lit a negative output is provided on the RXD line 74. This electrical signal represents the data transmission from the system controller 20 which is then compared to the predetermined values representing the desired condition of operation as stored previously in the monitor device 50.

Figure 5:
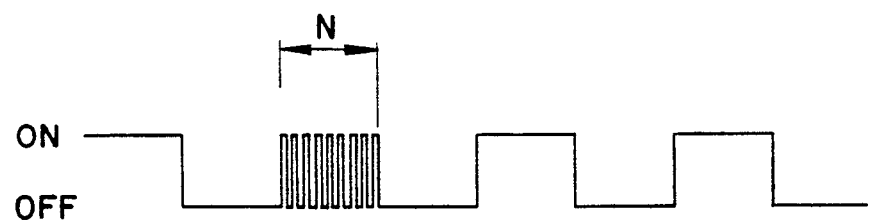
FIG. 5 is a schematic representation of the visual signal pattern with the superimposed diagnostic data transmission pattern.
Figure 4:
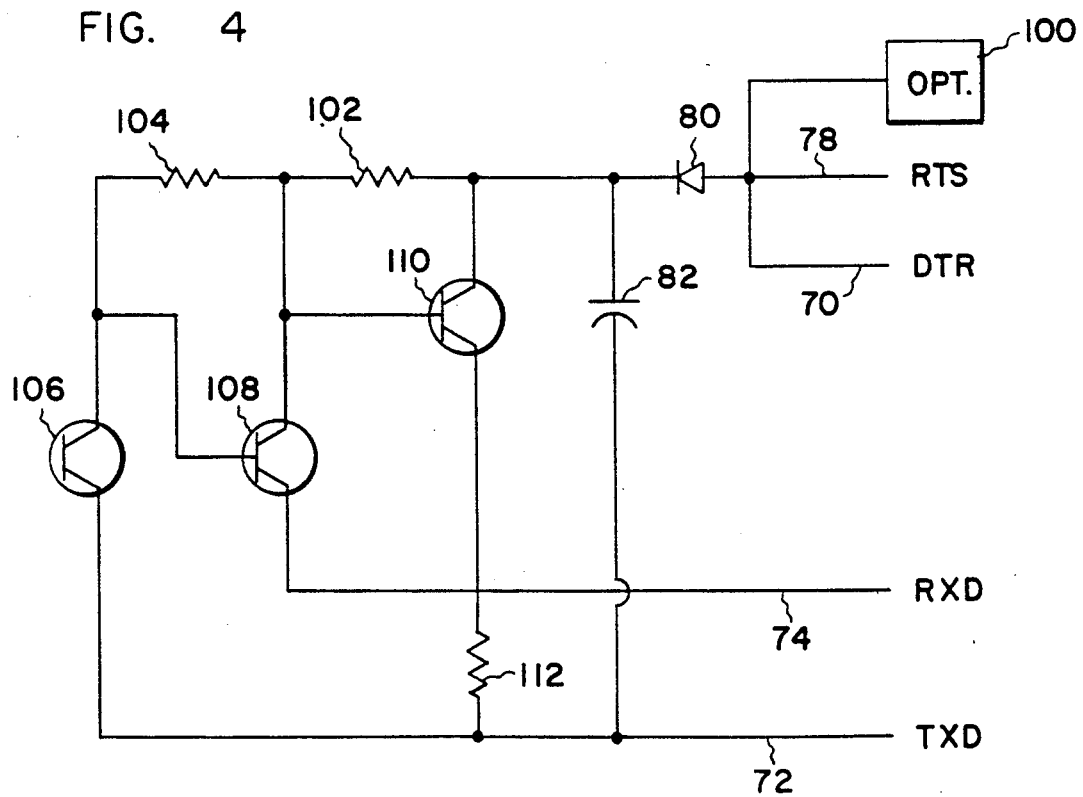
FIG. 4 is a schematic representation of the circuitry of an alternate embodiment of the subject invention.

Preferably, the LED 22 is operated on a specific cyclical sequence as shown in FIGS. 4 and 5, of one second ON(visual) and one second OFF(visual) or two seconds ON(visual) and one second OFF(visual). This provides a visual indication of the general operating condition of the system controller 20 to an observer. However, the main program or software instruction set of the microprocessor 26 stored in the ROM 30 also includes a subroutine for superimposing a data transmission over the ON(visual) portion of this LED 22 flashing cycle. This is accomplished by operating the LED in an ON OFF pattern corresponding to the ON or OFF (0 or 1) condition of the data bit being transmitted. Preferably. this data transmission occurs at a standard machine readable baud rate such as 1,200 baud. This permits the use of a relatively inexpensive, nonspeed critical LED 22, whereas higher baud rates such as 2,400, 9,600, or 19.2K baud, would require a more expensive and faster response speed LED 22. The use of the high speed data transmission baud rates would preferably be reserved for system controllers 20 having large amounts of data to be analyzed in the system diagnosis. The data transmitted could correspond to the LED 22 being flashed ON for the one condition and off for the zero condition, in accordance with the common zero and one binary coded data transmissions.

Figure 6:
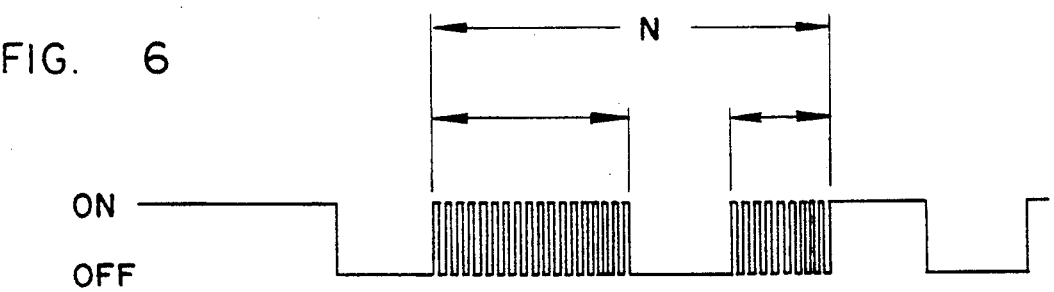
FIG. 6 is an alternative embodiment of a visual indication pattern with superimposed diagnostic data transmission pattern of the subject invention.

As shown more particularly in FIG. 5, representative of the one second ON(visual), one second OFF(visual) LED 22 pattern. a data pulse of one second is provided during one LED 22 ON(visual). The two second ON(visual), one second OFF(visual) LED 22 flash pattern is shown in FIG. 6 with a superimposed data transmission period N greater than the two second ON pulse. For example, this may be a three second period or longer as necessary to transmit the desired amount of data. In this event, the data transmission is interrupted by the one second OFF of the LED 22 flash pattern. Normally, the interpreting monitor device 50 will reject the one second OFF(visual) period as a "line break" or as a framing error, and will refuse to accept that error and hence, the OFF period of the LED 22 flash sequence will not interfere with the interpretation of the data stream.

The specified interval at which the microprocessor 26 will transmit the data for diagnosis is preselected and established as part of the main program in the ROM 30. The time at which such a data transmission is initiated may be once each minute, once each hour, or once each day. The interval at which the initiation of data transmission is specified to occur may be any interval which provides a convenient time of transmission of the data. It is believed that no detailed discussion is required regarding the preparation of a main program or subroutine enabling such a data transmission need be undertaken herein, as it is believed that the compulation of data transmission programs is well known and understood by those operating in the relevant arts. It is also believed that it is unnecessary to provide a detailed discussion of the interpreting monitor device 50, as it is believed that the method of programming a computer to analyze and interpret data received through an RS-232 connector in binary transmission form at a suitable baud rate is well known to those skilled in the relevant arts, and that a detailed discussion of such means is not necessary. Those skilled in the art will recognize that, as shown in FIGS. 4 and 5, the LED 22 may in fact be OFF during the ON(visual) indication, but that this will occur during the data transmission interval and will therefore be at a relatively rapid rate and extremely brief, and therefore will be generally imperceptible to the observer 45.

Turning now to FIG. 4, an alternative embodiment of the subject invention is disclosed. As in the preferred embodiment, the positive voltage source DTR line 70 is filtered through a diode 80 and a capacitor 82. However, the capacitor 82 is connected to the TXD line 72. Optionally, the positive voltage source may be a RTS line 78, normally assigned to pinout four or an optional positive voltage source such as a power supply or a battery pack (not shown). A first resistor 102, a second resistor 104 and a phototransistor 106 are serially disposed in parallel with the capacitor 82 between the RTS line 78 and the TXD line 72. A second transistor 108 is connected with an input between the first resistor 102 and the second resistor 104, having its base connected between the second resistor 104 and the phototransistor 106, and its output connected to the RXD line 74. The input of the second transistor 108 is also connected to the base of a third transistor 110. The third transistor 110 has an input connected between the power supply filter represented by the capacitor 82 and the first resistor 102. The output of the third transistor 110 is also connected to the RXD line 74, as well as to the TXD line 72 through a third resistor 112.

As with the preferred embodiment, in operation, the power supply input from the RTS line 78, the DTR line 70 or the optional voltage input source 100 is filtered through the diode 80 and the capacitor 82. The phototransistor 106 receives a negative voltage from the TXD line 72 and a positive voltage from the selected positive voltage input, which is reduced through the resistors 102 and 104. Therefore, only a leakage value current is passed to the second and third transistors 108 and 110, permitting the output on the RXD line 74 to be a negative value. When the phototransistor 106 responds to a light source input from the LED 22, current is transmitted and the second transistor 108 and third transistor 110 are activated to produce a positive output on the RXD line 74.

Typical values for the construction of the circuit of the alternative embodiment would be as follows, according to the industry standard conventions: phototransistor 106, number TIL414; the second transistor 108, number 2N2222A; the third transistor 110. number 2N2907A; the first resistor 102, 100 Ohms; the second resistor 104, 100K Ohms; the third resistor 112, 4.7K Ohms; the capacitor 82, 10 microfarads; the diode 80, number 1N914. It should be noted that these part numbers are exemplary only and should not be taken as limiting, as it will be apparent that other combinations of components would be equally suitable for producing the desired conversion circuit 62. Furthermore, it should be noted that the phototransistor 84 or 106 could be removed physically a distance from the body of the circuit by including a suitable two wire cable therebetween if it is desired to retain the body of the circuit in a RS-232 connecting hood immediately adjacent the monitor device 50.

The subject invention represents a substantial improvement in the art of system diagnosis for system controllers 20, by providing a ground isolated optical data transmission path while permitting the removal of unnecessary and expensive hardware from such system controllers 20. Furthermore, the method and apparatus of the subject invention is suitable for application to many different types of such system controllers, since the addition of the software routine in the main program of the microprocessor 26 does not interfere with the normal operation of the system controller 20, nor does it interfere with the normal visual indication of operation provided by the LED 22. Furthermore, as the diagnostic apparatus 10 is isolated from the system controller 20, there is no physical connection between the diagnostic apparatus 10 and the system controller 20 which may alter the electrical characteristics of the system controller 20 circuitry and thereby artificially alter the results obtained in the system diagnosis. Furthermore, the diagnostic apparatus 10 is lightweight and compact, being contained in a standard sized RS-232 connecting cable and hood, the diagnostic apparatus 10 is suitable for ready transport to and use in a variety of environments and eliminates the need for bulky and expensive transmission equipment. Additionally, the system controller 20 may be programmed to transmit data at other intervals. or to provide more data or less data as desired, simply by altering the main program stored in the ROM 30. This renders the system controller 20 readily adaptable to use in a wide variety of applications and environments while avoiding the requirement of additional hardware or expense in the preparation of the system controller 20 for such varying uses.

Modifications to the preferred embodiment of the subject invention will be apparent to those skilled in the art within the scope of the claims that follow hereinbelow.

What is claimed is:

1. A system diagnostic apparatus for diagnosing the operation of a system controller, said system diagnostic apparatus comprised of:
   a system controller having a light source status indicator indicating visually to an observer a general operating condition of said system controller with light emission during an ON(visual) indication, said system controller further including at least one microprocessor operably connected to said light source status indicator, said microprocessor superimposing at a selected interval an ON-OFF sequencing of the light emission of said light source status indicator during said ON(visual) indication to encode machine readable information into said light emission;
   a light emission receiver for receiving the light emission, said light emission receiver further including means for generating an electrical signal sequence corresponding to the ON-OFF sequencing of the light source status indicator, said electrical signal generating means further comprised of a phototransitor and a resistor mounted in parallel with a capacitor, a second resistor and a second transistor mounted in parallel with the capacitor, the phototransistor and the resistor and a third transistor connected to an output;
   monitor means for receiving said electrical signal sequence, interpreting said encoded machine readable information, and monitoring the operation of the systme controller.

2. A system diagnostic apparatus for diagnosing the operation of a system controller, said system diagnostic apparatus comprised of:
   a system controller having a light source status indicator indicating visually to an observer a general operating condition of said system controller with light emission during an ON(visual) indication, said system controller further including at least one microprocessor operably connected to said light source status indicator, said microprocessor superimposing at a selected interval an ON-OFF sequencing of the light emission of said light source status indicator during said ON(visual) indication to encode machine readable information into said light emission;

a light emission receiver for receiving the light emission, said light emission receiver further including means for generating an electrical signal sequence corresponding to the ON-OFF sequencing of the light source status indicator, said electrical signal generating means further comprised of a first resistor, a second resistor and a phototransitor serially disposed in parallel with a capacitor, a second transistor having an input between the first resistor and the second resistor, said second transistor having an output, a third transistor having an input connection between said capacitor and the first resistor, said third transistor having an output; and monitor means connected to said second transistor output and said third transistor output of said electrical signal generating means for receiving said electrical signal sequence, interpreting said encoded machine readable information, and monitoring the operation of the system controller.

3. A system diagnostic apparatus for diagnosing the operating of a system controller, said system diagnostic apparatus comprised of:

a system controller having a light source status indicator visually indicating to an observer a condition of said system controller with an ON(visual) and OFF(visual) cyclical light emission, said system controller further including at least one microprocessor operably connected to said light source status indicator, said microprocessor superimposing at a selected interval an ON-OFF sequencing of the light emission of said light source status indicator during said ON(visual) indication at a selected baud rate to encode machine readable information into said light emission:

a light emission receiver comprising a conversion circuit, said conversion circuit having a phototransistor for receiving the light emission including the encoded machine readable information, said light emission receiver further including means for generating an electrical signal sequence corresponding to the encoded machine readable information in the ON-OFF sequencing of the light source status indicator, said electrical signal generating means further comprised of a phototransitor and a resistor mounted in parallel with a capacitor, a second resistor and a second transistor mounted in parallel with the capacitor, the phototransistor and the resistor, and a third transistor connected to an output; and a monitor means for monitoring and interpreting the encoded machine readable information and thereby the operation of the system controller, said monitor means comprised of:

means for storing a desired electrical signal sequence for indicating the desired operation of the system controller;

means for receiving the electrical signal sequence corresponding to the on-off sequencing of the light source status indicator;

means for comparing the received electrical signal sequence to the desired electrical signal sequence; and means for displaying said comparison in a human readable format.

4. A system diagnostic apparatus for diagnosing the operation of a system controller, said system diagnostic apparatus comprised of:

a system controller having a light source status indicator visually indicating to an observer a condition of said system controller with an ON(visual) and OFF(visual) cyclical light emission, said system controller further including at least one microprocessor operably connected to said light source status indicator, said microprocessor superimposing at a selected interval an ON-OFF sequencing of the light emission of said light source status indicator during said ON(visual) indication at a selected baud rate to encode machine readable information into said light emission;

a light emission receiver comprising a conversion circuit, said conversion circuit having a phototransistor for receiving the light emission including the encoded machine readable information, said light emission receiver further including means for generating an electrical signal sequence corresponding to the encoded machine readable information in the ON-OFF sequencing of the light source status indicator, said electrical signal generating means further further comprised of a first resistor, a second resistor and a phototransistor serially disposed in parallel with a capacitor, a second transistor having an input between the first resistor and the second resistor, said second transistor having an output, a third transistor having an input connection between said capacitor and the first resistor, said third transistor having an output; and a monitor means connected to said second transistor output and said third transistor output of said electrical signal generating means for monitoring and interpreting the encoded machine readable information and thereby the operation of the system controller, said monitor means comprised of:

means for storing a desired electrical signal sequence for indicating the desired operation of the system controller;

means for receiving the electrical signal sequence corresponding to the on-off sequencing of the light source status indicator;

means for comparing the received electrical signal sequence to the desired electrical signal sequence; and means for displaying said comparison in a human readable format.

* * * * *